3,106,469
METHOD OF OBTAINING DETOXIFIED MUSTARD SEED PRODUCTS

Gus C. Mustakas, Peoria, and Larry D. Kirk, East Peoria, Ill., assignors to the United States of America as represented by the Secretary of Agriculture
No Drawing. Filed Dec. 2, 1960, Ser. No. 73,465
2 Claims. (Cl. 99—2)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a novel and commercially advantageous process of treating allyl isothiocyanate-containing seeds belonging to the family Brassica, especially mustard seed, to provide a detoxified vegetable oil and particularly detoxified mustard seed meal which, unlike undetoxified mustard seed meal, will not require dilution with at least nine parts of other meal or feed for animal acceptance and freedom from significant toxicity.

Some detoxified mustard seed meal has been used as a livestock feed in recognition of its 35–40 percent protein content, but such use is limited by the expensiveness of the present commercial practice in which the meal is first defatted and then repeatedly washed with large amounts of water to remove the unpalatable and toxic allyl isothiocyanate glucoside. Moreover, repeatedly subjecting the hexane-extracted meal to relatively large amounts of water causes the release of very troublesome vegetable gums which seriously interfere with subsequent pressing, screening, and drying operations on the meal.

Accordingly, the principal object of our invention is a novel, inexpensive, and commercially adaptable process of detoxifying allyl isothiocyanate-containing vegetable seed meals and oils, so as to render these materials nontoxic and thereby extend the uses and markets for the domestically grown mustard seed cash crop.

Another object is to provide a gum-free detoxification process.

Still another object is a process in which high yields of pure allyl isothiocyanate may be readily recovered for use as an industrial chemical in making allyl derivatives for plastics, aromatic intermediates for perfumes, etc.

Still another object is a process which inexpensively provides a bland nontoxic oil for both animal and human consumption and which has a further commercial potential because of its high erucic acid content.

The above and other objects, which will be apparent to one skilled in the art, can be achieved through the novel process comprising our invention.

It is known that the allyl isothiocyanate of Brassica seed species, such as mustard seed, is present in the form of a glucoside, which glucoside is hydrolyzed under favorable conditions by an enzyme (myrosinase) naturally present in the seed. In the commercially advantageous process of the instant invention we deliberately employ this enzyme by adding a small amount (about 0.3 percent) of freshly ground uninactivated mustard seed to a large proportion of heat inactivated, finely-ground mustard seed, the mixture then being sprayed with sufficient water to provide a critical moisture content of 15–16 percent in the meal and slowly mixing and heating at an enzyme-favorable temperature of about 50° C. for about 45 minutes to enzymatically hydrolyze the glucoside and free the allyl isothiocyanate. Then the temperature in the cooker is gradually increased to about 110–130° C. to distill off the free allyl isothiocyanate and most of the water, from which distillate the isothiocyanate can be recovered in known manner, as by decantation or by extraction with hexane followed by distillation therefrom. Upon cooling, the meal, which now contains only 0.02–0.05 percent residual isothiocyanate, about 7 percent moisture, and its full complement of vegetable oil, the said meal hardens to friable agglomerates which are subdivided by passage through a No. 5 mesh screen and then defatted in any desired manner, as with hexane, leaving a meal containing 1–3 percent residual oil and only traces of allyl isothiocyanate, the latter being readily removed from the meal by steaming for 30–60 minutes separately or concurrently with a desolventizing step. Any trace of allyl isothiocyanate in the oil is removed in the conventional bleaching and deodorizing treatments.

The above stated moisture content of 15–16 percent is critical to a continuous commercial process, because at a lower level there is incomplete enzymatic hydrolysis of the glucoside while at even a moisture content of 17 percent, vegetable gums and oils are released from the meal, rendering prohibitively difficult the oil-extraction and filtration operations.

It will be understood that although we employed a paddled rake-equipped cooker, any cooker providing an equivalent mixing function, such as a kneader-mixer, may be employed. Also, it is obvious that with or without suitable slight modifications the detoxification process of the instant invention may also be applied to the treatment of allyl isothiocyanate-containing seeds such as rapeseed, which contain other toxic components in addition to allyl isothiocyanate.

The following example will further teach the process of our invention.

Example 1

Montana-grown oriental mustard seed (*Brassica juncea*) was dried at 100° C. for 2 hours and then ground to a fine meal (by wet-sieve analysis in hexane 50–75 percent of the particles passed a 300-mesh screen). Five hundred and fifty g. of the above meal was placed in a cooking vessel equipped with heating means, temperature control, motor-driven rake-type agitator with stationary baffles, an outlet connected to a condenser, and a water-inlet. Then 1.8 g. of unheated, freshly ground mustard seed meal (containing active enzyme) was added, and slow agitation (mixing) was begun. Sufficient water was sprayed upon the mixture to provide a moisture content of 15.5 percent. The cooker and its contents were held at 50° C. for about 45 minutes to obtain enzymatic hydrolysis of the allyl isothiocyanate-containing glucoside. Then the temperature was raised to about 115° C. for about 30 minutes to simultaneously cook the meal, rupture the cell membranes thus releasing oil, reduce the moisture content of the meal to about 7.5 percent, and distill a condensable vapor comprising allyl isothiocyanate and water. Upon cooling to room temperature, the meal formed crisp, friable agglomerates which yielded readily to passage through a No. 5 screen. The meal, which originally had an allyl isothiocyanate content of .493 percent but now had a content of 0.039 percent, was slurried under miscella-type hexane extraction-filtration conditions to recover the mustard seed oil, and then steamed. The final mustard seed meal had a bland taste and contained no residual allyl isothiocyanate.

Having fully disclosed our invention, we claim:
1. A process for obtaining detoxified mustard seed meal and mustard seed oil comprising the steps of adding about 0.3 part of freshly ground enzyme-containing mustard seed meal to 100 parts of a heat-treated, substantially dried, finely ground mustard seed meal, adding water to provide a moisture content of 15–16 percent, heating and mixing the freshly ground and heat-treated meals at 50° C. for about 45 minutes to enzymatically hydrolyze the glucoside comprising allyl isothiocyanate, raising the temperature to above 100° C. for about 30 minutes to vaporize off most of the moisture and substantially all of the enzyme-liberated allyl isothiocyanate, cooling the meal to room temperature, solvent-extracting the meal, removing the solvent, and steaming the oil-free meal to remove trace allyl isothiocyanate.

2. A process for detoxifying mustard seed which comprises adding about 0.3 part of freshly-ground enzyme-containing mustard seed meal to about 100 parts of heat-treated, susbtantially dried, finely ground mustard seed meal, adding water to provide a total moisture content of 15–16%, heating the resulting moistened mixture to about 50° C. for a time sufficient to activate the constituent enzyme and thereby hydrolyze the glucoside comprising allyl isothiocyanate which is present in said seed, then heating to a temperature of at least 100° C. to remove most of the moisture and substantially all of the enzyme-liberated allyl isothiocyanate, then extracting the meal with hexane to dissolve substantially all of the constituent vegetable oil, removing the solvent containing said vegetable oil, and steaming to recover a detoxified meal.

References Cited in the file of this patent
UNITED STATES PATENTS
2,987,399   Goering _____ June 6, 1961